(12) United States Patent
Wagner et al.

(10) Patent No.: US 11,994,751 B1
(45) Date of Patent: May 28, 2024

(54) DUAL SYSTEM ON A CHIP EYEWEAR

(71) Applicants: Daniel Wagner, Vienna (AT); Erick Mendez Mendez, Vienna (AT); Patrick Timothy McSweeney Simons, Redondo Beach, CA (US); Daniel Colascione, Seattle, WA (US)

(72) Inventors: Daniel Wagner, Vienna (AT); Erick Mendez Mendez, Vienna (AT); Patrick Timothy McSweeney Simons, Redondo Beach, CA (US); Daniel Colascione, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/138,269

(22) Filed: Dec. 30, 2020

(51) Int. Cl.
| | |
|---|---|
| *G02C 11/00* | (2006.01) |
| *G02B 27/01* | (2006.01) |
| *G02C 5/14* | (2006.01) |
| *G06F 1/16* | (2006.01) |

(52) U.S. Cl.
CPC ............ *G02C 11/10* (2013.01); *G02B 27/017* (2013.01); *G02C 5/146* (2013.01); *G06F 1/163* (2013.01); *G02B 2027/0178* (2013.01)

(58) Field of Classification Search
CPC .......... G02B 27/017; G02B 2027/0178; G02C 11/10; G02C 5/146; G06F 1/163
See application file for complete search history.

(56) References Cited

U.S. PATENT DOCUMENTS

| | | |
|---|---|---|
| 9,703,336 B2 | 7/2017 | Alton et al. |
| 10,194,228 B2 | 1/2019 | Hirsch |
| 10,216,236 B1 | 2/2019 | Ashwood et al. |
| 10,509,466 B1 | 12/2019 | Miller et al. |
| 10,809,304 B1 | 10/2020 | Larson et al. |
| 10,983,581 B2 | 4/2021 | Jahagirdar et al. |
| 2003/0048256 A1 | 3/2003 | Salmon |
| 2006/0047808 A1 | 3/2006 | Sharma et al. |
| 2013/0114850 A1 | 5/2013 | Publicover et al. |
| 2014/0052965 A1 | 2/2014 | Sarel |
| 2015/0248566 A1 | 9/2015 | Scott-Nash et al. |
| 2015/0261293 A1 | 9/2015 | Wilairat et al. |

(Continued)

OTHER PUBLICATIONS

International Search Report and Written Opinion for International Application No. PCT/US2022/037349, dated Oct. 27, 2022 (Oct. 27, 2022)—15 pages.

(Continued)

*Primary Examiner* — Matthew A Eason
*Assistant Examiner* — Chayce R Bibbee
(74) *Attorney, Agent, or Firm* — Culhane Meadows PLLC; Stephen J. Weed

(57) ABSTRACT

Eyewear including a frame having a first side and a second side, a first temple extending from the first side of the frame, a second temple extending from the second side of the frame, electronic components, a first system on a chip (SoC) adjacent the first side of the frame coupled to a first set of the electronic components, and a second system on a chip adjacent the second side, the second SoC coupled to the first SoC and to a second set of the plurality of electronic components. Processing workloads are balanced between the first SoC and the second SoC by performing a first set of operations with the first SoC and performing a second set of operations with the second SoC.

20 Claims, 14 Drawing Sheets

(56) References Cited

U.S. PATENT DOCUMENTS

| | | |
|---|---|---|
| 2015/0286225 A1 | 10/2015 | Park et al. |
| 2015/0309316 A1* | 10/2015 | Osterhout ............ G06F 3/03547 345/8 |
| 2016/0078278 A1 | 3/2016 | Moore et al. |
| 2017/0300394 A1 | 10/2017 | Raut |
| 2017/0371719 A1 | 12/2017 | Majumdar et al. |
| 2018/0157517 A1 | 6/2018 | Dong et al. |
| 2018/0329465 A1 | 11/2018 | Tavakoli et al. |
| 2019/0064891 A1 | 2/2019 | Ashwood et al. |
| 2019/0187765 A1 | 6/2019 | Ashwood et al. |
| 2019/0286232 A1 | 9/2019 | De Nardi et al. |
| 2019/0310872 A1 | 10/2019 | Griffin et al. |
| 2020/0089516 A1 | 3/2020 | Vijayvargiya et al. |
| 2020/0186813 A1 | 6/2020 | Fishwick |
| 2020/0310140 A1 | 10/2020 | Kamakura |
| 2020/0319937 A1* | 10/2020 | Matthes ................ G06F 9/5094 |
| 2020/0383240 A1 | 12/2020 | Rohena et al. |
| 2021/0103669 A1 | 4/2021 | Shinde et al. |
| 2021/0129779 A1 | 5/2021 | Kim et al. |
| 2021/0149465 A1 | 5/2021 | Hiltner et al. |
| 2021/0157390 A1 | 5/2021 | Yardi et al. |
| 2021/0289502 A1 | 9/2021 | Ang et al. |
| 2021/0297584 A1 | 9/2021 | Moubedi |
| 2021/0318558 A1 | 10/2021 | Tzvieli et al. |
| 2022/0012112 A1 | 1/2022 | Wouhaybi et al. |
| 2022/0019396 A1 | 1/2022 | Choi et al. |
| 2022/0197856 A1 | 6/2022 | Khasawneh et al. |
| 2023/0108121 A1 | 4/2023 | Feinman |

OTHER PUBLICATIONS

International Search Report and Written Opinion for International Application No. PCT/US2022/044798, dated Jan. 20, 2023 (Jan. 20, 2023)—12 pages.

International Search Report and Written Opinion for International Application No. PCT/US2022/045150, dated Jan. 20, 2023 (Jan. 20, 2023)—10 pages.

Zhang, Yiming et al: "KylinX: Simplified Virtualization Architecture for Specialized Virtual Appliances with Strong Isolation", ACM Transactions on Computer Systems (TOCS), Association for Computing Machinery, Inc, US, vol. 37, No. 1-4, Feb. 12, 2021 (Feb. 12, 2021), pp. 1-27.

International Search Report and Written Opinion for International Application No. PCT/US2022/045156, dated Jan. 30, 2023 (Jan. 30, 2023)—17 pages.

International Search Report and Written Opinion for International Application No. PCT/US2022/045386, dated Feb. 3, 2023 (Mar. 2, 2023)—17 pages.

International Search Report and Written Opinion for International Application No. PCT/US2022/045395, dated Feb. 3, 2023 (Mar. 2, 2023)—17 pages.

* cited by examiner

DUAL SYSTEM ON A CHIP EYEWEAR

TECHNICAL FIELD

Examples set forth in the present disclosure relate to the field of electronic devices and, more particularly, to eyewear devices that includes a first system on a chip and a second system on a chip.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added letter referring to a specific element. The letter may be dropped when referring to more than one of the elements or a non-specific one of the elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
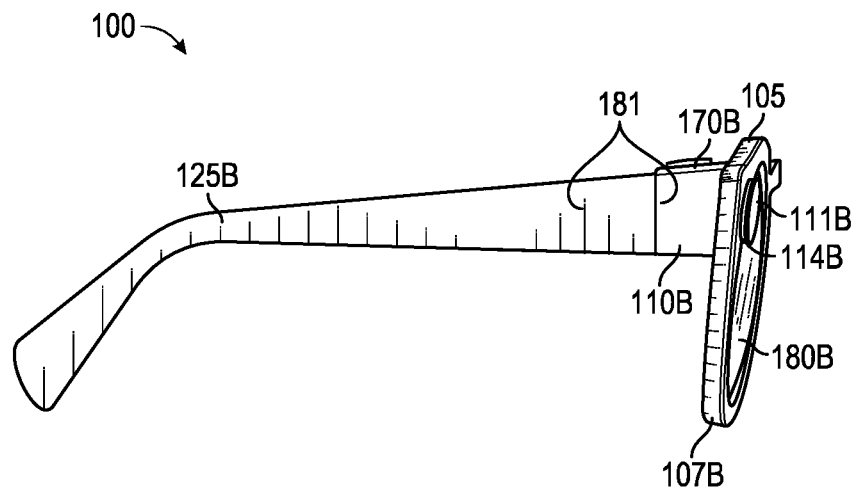
FIG. 1A is a side view (right) of an example hardware configuration of an eyewear device suitable for use in an eyewear system.

Eyewear devices that include two SoCs that share processing workload are described. Instead of using a single SoC located either on the left or right side of the eyewear devices, the two SoCs share the processing workload. This provides improved thermal balance that enables eyewear device designs with increased overall thermal capacity, increased computational power, reduced interconnect complexity, or a combination thereof over single SoC eyewear devices.

In one example, the eyewear device utilizes a first SoC and a second SoC to balance processing workload. The eyewear includes a frame having a first side and a second side, a first temple extending from the first side of the frame, a second temple extending from the second side of the frame, and electronic components. The first SoC is adjacent the first side of the frame and is coupled to a first set of the electronic components. The second SoC is adjacent the second side of the frame and is coupled to the first SoC and to a second set of the electronic components. Processing workloads are balanced between the first SoC and the second SoC by performing a first set of operations with the first SoC and performing a second set of operations with the second SoC.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "system on a chip" or "SoC" are used herein to refer to an integrated circuit (also known as a "chip") that integrates components of an electronic system on a single substrate or microchip. These components include a central processing unit (CPU), a graphical processing unit (GPU), an image signal processor (ISP), a memory controller, a video decoder, and a system bus interface for connection to another SoC. The components of the SoC may additionally include, by way of non-limiting example, one or more of an interface for an inertial measurement unit (IMU; e.g., I2C, SPI, I3C, etc.), a video encoder, a transceiver (TX/RX; e.g., Wi-Fi, Bluetooth®, or a combination thereof), and digital, analog, mixed-signal, and radio frequency signal processing functions.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown in FIG. 1A, the eyewear device 100 includes a right visible-light camera 114B. As further described herein, two cameras 114A, 114B capture image information for a scene from two separate viewpoints. The two captured images may be used to project a three-dimensional display onto an image display for viewing on or with 3D glasses.

Figure 1B:
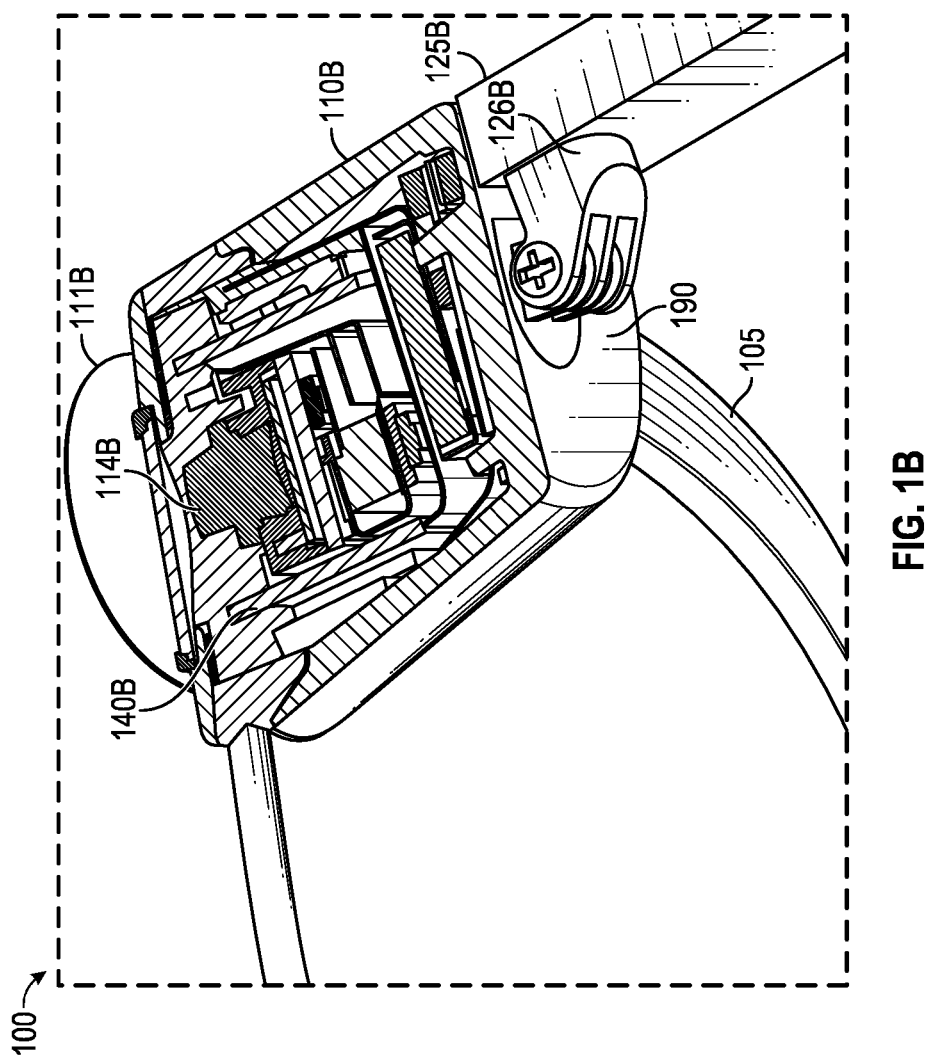
FIG. 1B is a perspective, partly sectional view of a right temple portion of the eyewear device of FIG. 1A depicting a right visible-light camera, and a circuit board.
Figure 1C:
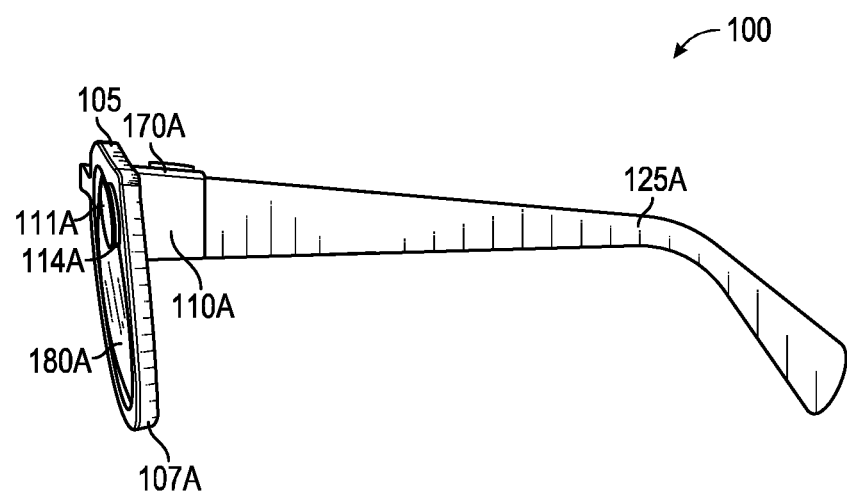
FIG. 1C is a side view (left) of an example hardware configuration of the eyewear device of FIG. 1A, which shows a left visible-light camera.
Figure 1D:
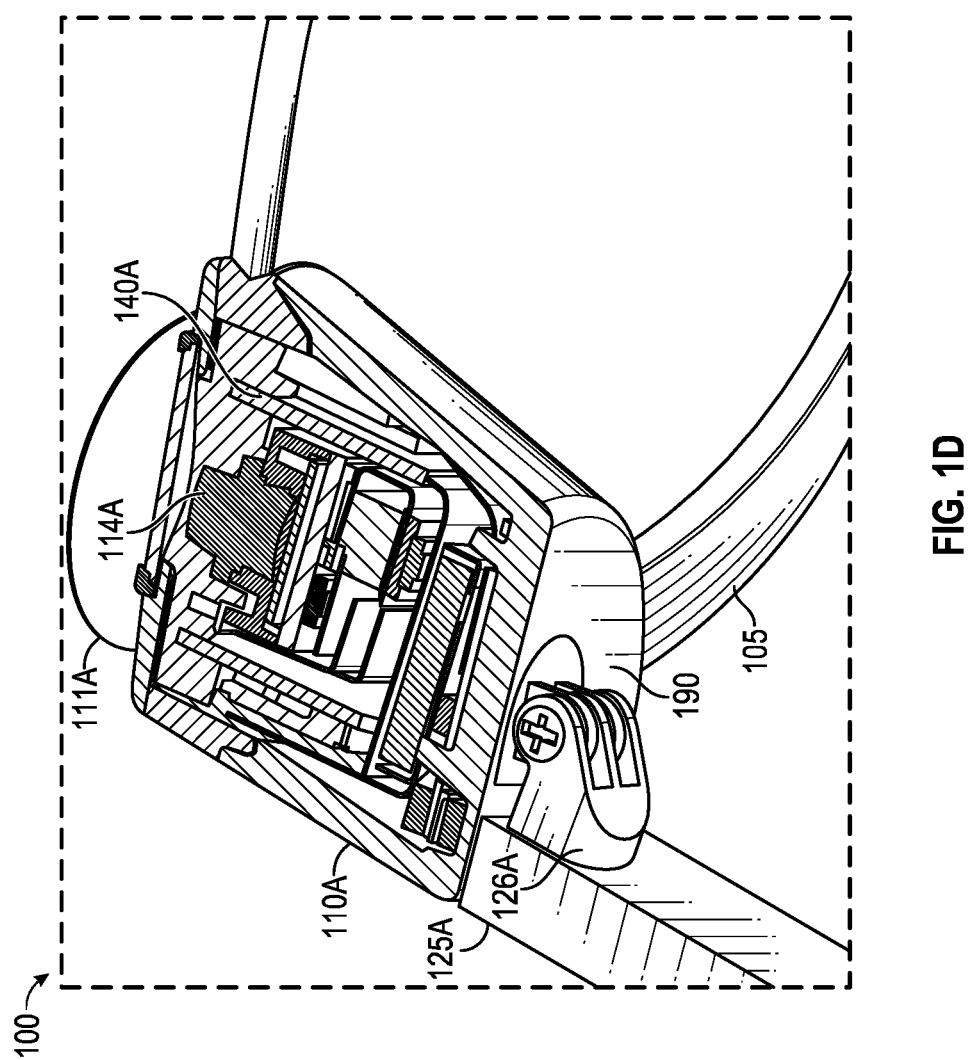
FIG. 1D is a perspective, partly sectional view of a left temple portion of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right temple portion 110B. As shown in FIGS. 1C-D, the eyewear device 100 also includes a left visible-light camera 114A location on a left temple portion 110A.

Figure 3:
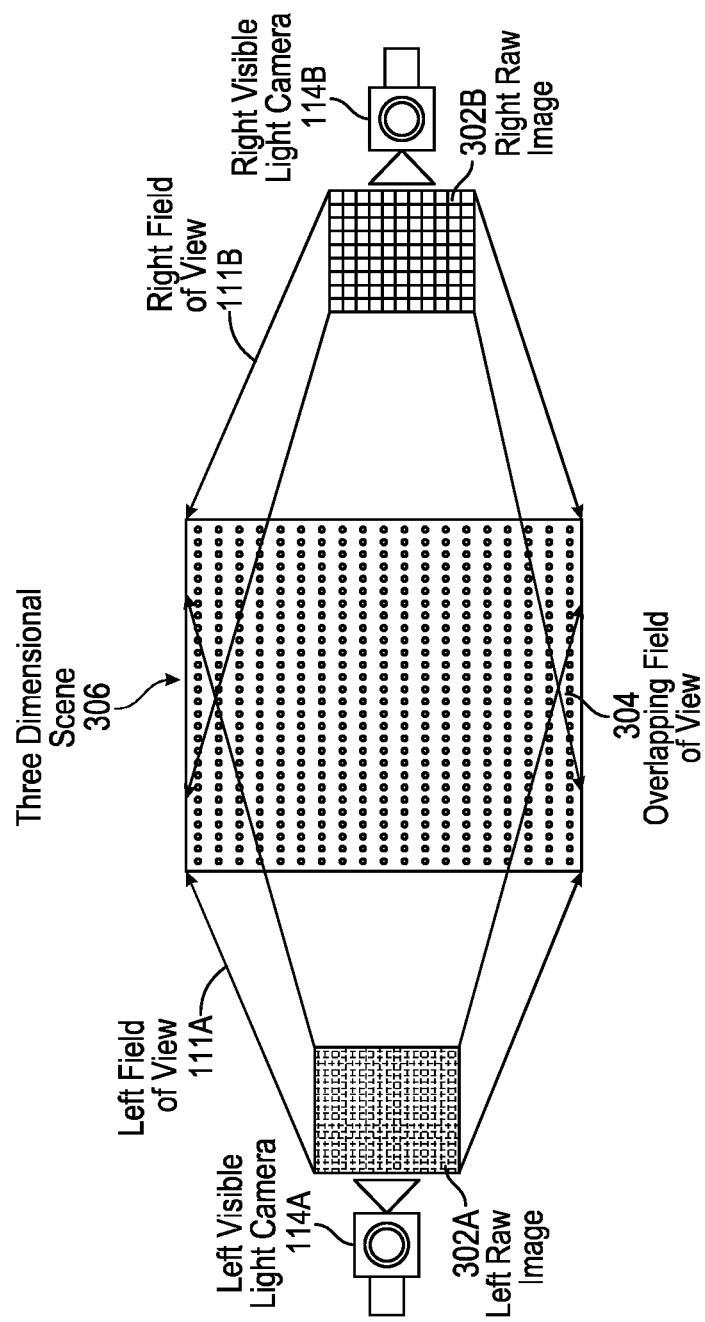
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images. Right visible-light camera 114B captures a right field of view 111B and left visible-light camera 114A captures a left field of view 111A. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels or greater. In another example, the field of view can be much wider, such as 100° or greater. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, an image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right temple portion 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left temple portion 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A.

As shown in the example of FIG. 1B, the eyewear device 100 includes the right visible-light camera 114B and a circuit board 140B, which may be a flexible printed circuit board (PCB). A right hinge 126B connects the right temple portion 110B to a right temple 125B of the eyewear device 100. In some examples, components of the right visible-light camera 114B, the flexible PCB 140B, or other electrical connectors or contacts may be located on the right temple 125B, the right hinge 126B, the right temple portion 110B, the frame 105, or a combination thereof. The components (or subset thereof) may be incorporated in an SoC.

As shown in the example of FIG. 1D, the eyewear device 100 includes the left visible-light camera 114A and a circuit board 140A, which may be a flexible printed circuit board (PCB). A left hinge 126A connects the left temple portion 110A to a left temple 125A of the eyewear device 100. In some examples, components of the left visible-light camera 114A, the flexible PCB 140A, or other electrical connectors or contacts may be located on the left temple 125A, the left hinge 126A, the left temple portion 110A, the frame 105, or a combination thereof. The components (or subset thereof) may be incorporated in an SoC.

The left temple portion 110A and the right temple portion 110B includes temple portion body 190 and a temple portion cap, with the temple portion cap omitted in the cross-section of FIG. 1B and FIG. 1D. Disposed inside the left temple portion 110A and the right temple portion 110B are various interconnected circuit boards, such as PCBs or flexible PCBs, that include controller circuits for the respective left visible-light camera 114A and the right visible-light camera 114B, microphone(s) 130, speaker 132, low-power wireless circuitry (e.g., for wireless short range network communication via Bluetooth™), high-speed wireless circuitry (e.g., for wireless local area network communication via Wi-Fi). The components and circuitry (or subset thereof) in each temple portion 110 may be incorporated in an SoC.

Figure 2A:
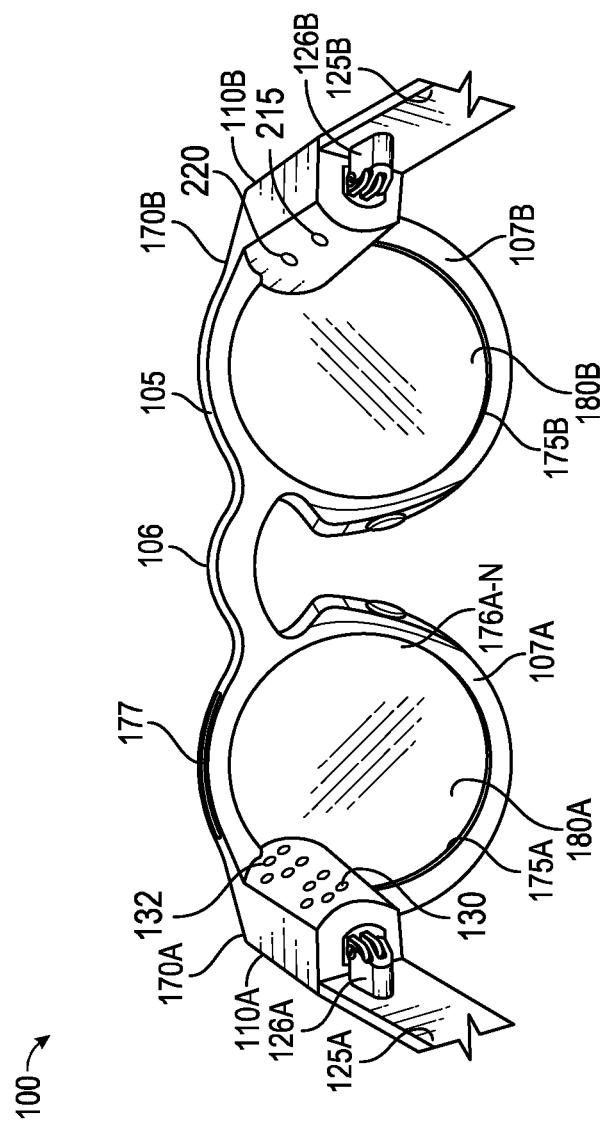
FIGS. 2A and 2B are rear views of example hardware configurations of an eyewear device utilized in the eyewear system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right temple portion 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right temple portion 110B in which an opening is formed with an outward-facing angle of coverage, but in a different outwardly direction. The coupling can also be indirect via intervening components. Although shown as being formed on the circuit boards of the right temple portion 110B, the right visible-light camera 114B can be formed on the circuit boards of the left temple 125B or the frame 105.

The left visible-light camera 114A is coupled to or disposed on the flexible PCB 140A and covered by a visible-light camera cover lens, which is aimed through opening(s) formed in the frame 105. For example, the left rim 107A of the frame 105, shown in FIG. 2A, is connected to the left temple portion 110A and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the left visible-light camera 114A has an outward-facing field of view 111A (shown in FIG. 3) with a line of sight or perspective that is correlated with the left eye of the user of the eyewear device 100. The visible-light camera cover lens can also be adhered to a front side or outward-facing surface of the left temple portion 110A in which an opening is formed with an outward-facing angle of coverage, but in a different outwardly direction. The coupling can also be indirect via intervening components. Although shown as being formed on the circuit boards of the left temple portion 110A, the left visible-light camera 114A can be formed on the circuit boards of the left temple 125A or the frame 105.

Figure 2B:
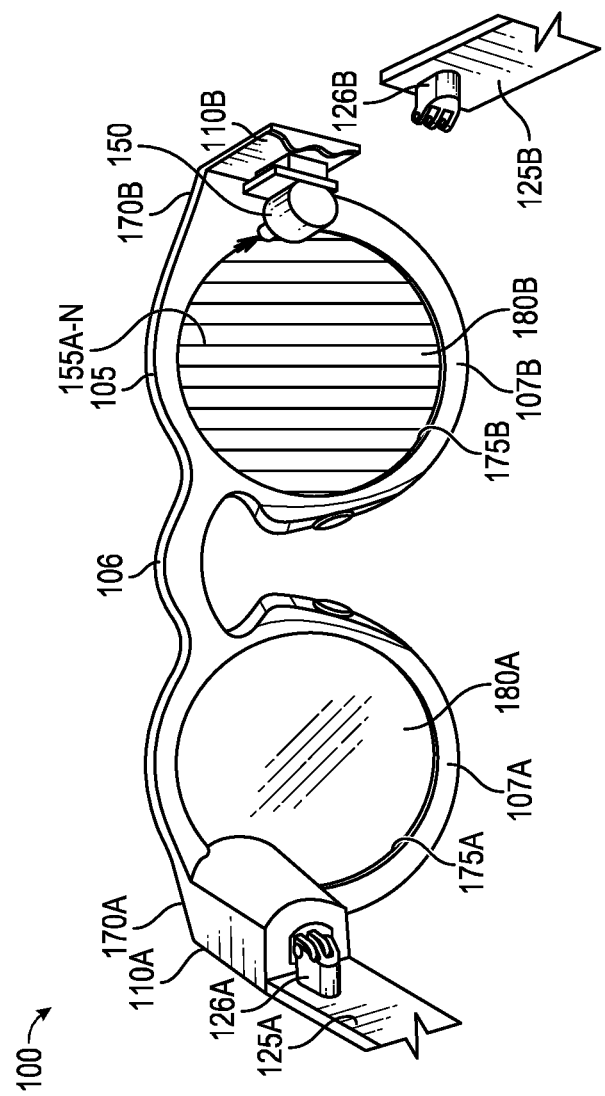

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left temple portion 110A adjacent the left lateral side 170A of the frame 105 and a right temple portion 110B adjacent the right lateral side 170B of the frame 105. The temple portions 110A, 110B may be integrated into the frame 105 on the respective lateral sides 170A, 170B (as illustrated) or implemented as separate components attached to the frame 105 on the respective lateral sides 170A, 170B. Alternatively, the temple portions 110A, 110B may be integrated into temples (not shown) attached to the frame 105.

In one example, the image display of optical assembly 180A, 180B includes an integrated image display 177. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

In another example, the eyewear device 100 shown in FIG. 2B may include two projectors, a left projector (not shown) and a right projector (shown as projector 150). The left optical assembly 180A may include a left display matrix (not shown) or a left set of optical strips (not shown) which are configured to interact with light from the left projector. In this example, the eyewear device 100 includes a left display and a right display.

As further shown in FIGS. 2A and 2B, eyewear device 100 includes a left temple portion 110A adjacent the left lateral side 170A of the frame 105 and a right temple portion 110B adjacent the right lateral side 170B of the frame 105. The temple portions 110A, 110B may be integrated into the frame 105 on the respective lateral sides 170A, 170B (as illustrated) or implemented as separate components attached to the frame 105 on the respective lateral sides 170A, 170B. Alternatively, the temple portions 110A, 110B may be integrated into temples 125A, 125B attached to the frame 105.

Referring to FIG. 2A, the frame 105 or one or more of the left and right temples 110A-B include an infrared emitter 215 and an infrared camera 220. The infrared emitter 215 and the infrared camera 220 can be connected to the flexible PCB 140B by soldering, for example. Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the temples 110A-B, or vice versa. The infrared emitter 215 can be connected essentially anywhere on the frame 105, left temple 110A, or right temple 110B to emit a pattern of infrared light. Similarly, the infrared camera 220 can be connected essentially anywhere on the frame 105, left temple 110A, or right temple 110B to capture at least one reflection variation in the emitted pattern of infrared light.

The infrared emitter 215 and infrared camera 220 are arranged to face inwards towards an eye of the user with a partial or full field of view of the eye in order to identify the respective eye position and gaze direction. For example, the infrared emitter 215 and infrared camera 220 are positioned directly in front of the eye, in the upper part of the frame 105 or in the temples 110A-B at either ends of the frame 105.

Figure 2C:
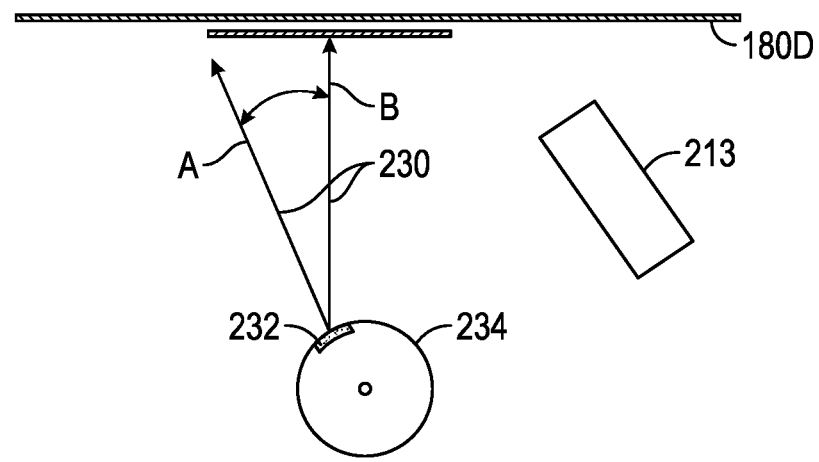
FIG. 2C illustrates detecting eye gaze direction.
Figure 2D:
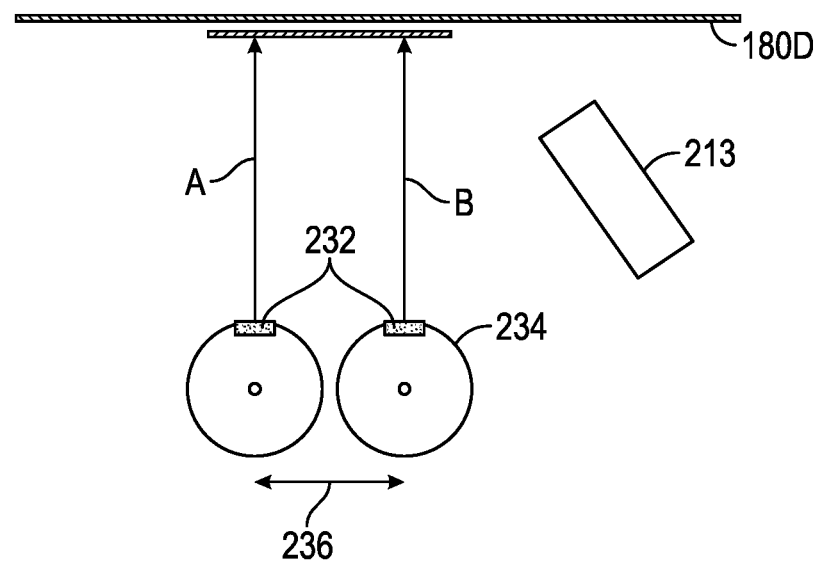
FIG. 2D illustrates detecting eye position.

In an example, the processor 432 utilizes eye tracker 213 to determine an eye gaze direction 230 of a wearer's eye 234 as shown in FIG. 2C, and an eye position 236 of the wearer's eye 234 within an eyebox as shown in FIG. 2D. In one example, the eye tracker 213 is a scanner which uses infrared light illumination (e.g., near-infrared, short-wavelength infrared, mid-wavelength infrared, long-wavelength infrared, or far infrared) to capture image of reflection variations of infrared light from the eye 234 to determine the gaze direction 230 of a pupil 232 of the eye 234, and also the eye position 236 with respect to the display 180D.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a time-stamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, an eyewear system 400 (FIG. 4) includes the eyewear device 100, which includes a frame 105, a left temple 110A extending from a left lateral side 170A of the frame 105, and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105, left temple 125A, or left temple portion 110A to capture a left raw image 302A from the left side of scene 306. The eyewear device 100 further includes a right visible-light camera 114B with a right field of view 111B. The right camera 114B is connected to the frame 105, right temple 125B, or right temple portion 110B to capture a right raw image 302B from the right side of scene 306.

Figure 4:
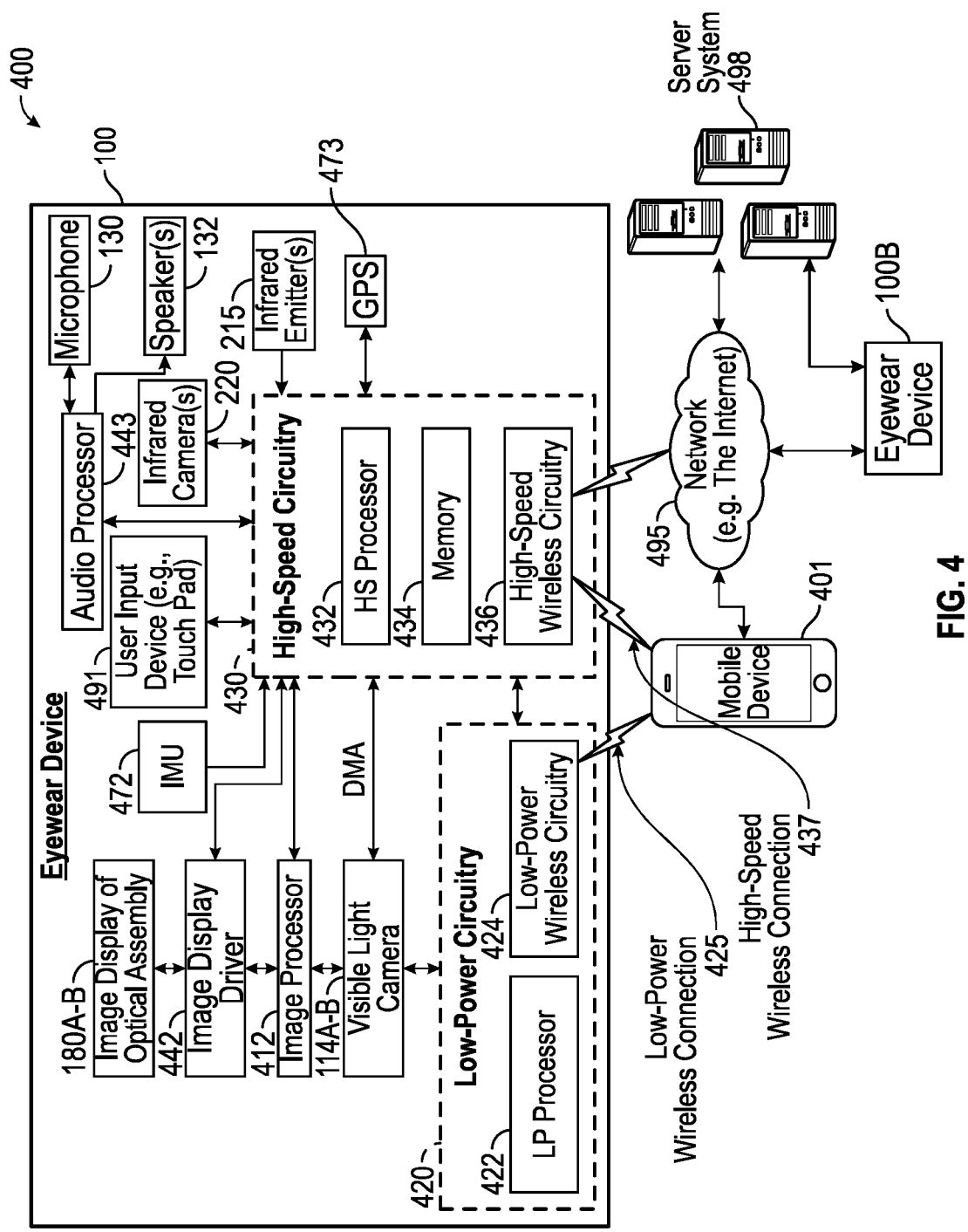
FIG. 4 is a functional block diagram of an example eyewear system including an eyewear device connected to a mobile device and a server system via various networks.

FIG. 4 is a functional block diagram of an example eyewear system 400 that includes a wearable device (e.g., an eyewear device 100), a mobile device 401, and a server system 498 connected via various networks 495 such as the Internet. The eyewear system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene.

The eyewear device 100 further includes two optical assemblies 180A, 180B (one associated with the left lateral side 170A and one associated with the right lateral side 170B). The eyewear device 100 also includes an image display driver 442, an image processor 412, low-power circuitry 420, and high-speed circuitry 430 (all of which may be duplicated and incorporated into a pair of SoCs). The image displays 177 of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more microphones 130 and speakers 132 (e.g., one of each associated with the left side of the eyewear device and another associated with the right side of the eyewear device). The microphones 130 and speakers 132 may be incorporated into the frame 105, temples 125, or temple portions 110 of the eyewear device 100. The one or more speakers 132 are driven by audio processor 443 (which may be duplicated and incorporated into a pair of SoCs) under control of low-power circuitry 420, high-speed circuitry 430, or both. The speakers 132 are for presenting audio signals including, for example, a beat track. The audio processor 443 is coupled to the speakers 132 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the temple portions, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 220, the image processor 412, and images generated for display 177 by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
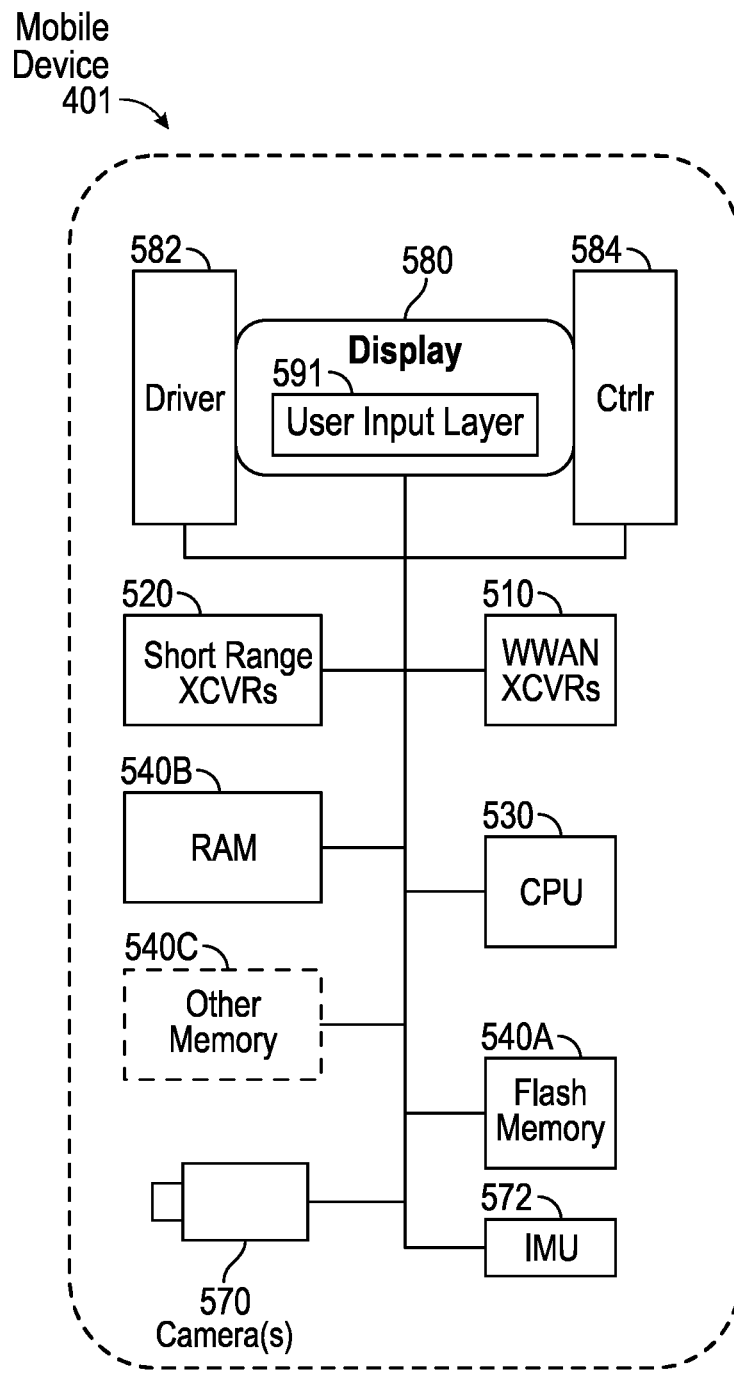
FIG. 5 is a diagrammatic representation of an example hardware configuration for a mobile device of the eyewear system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with one or more eyewear devices 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include input components (e.g., a touch screen or touchpad 181 configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472 (which may be duplicated and incorporated into a pair of SoCs). The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors (which may be duplicated and incorporated into a pair of SoCs). Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The eyewear system 400, as shown in FIG. 4, includes a computing device, such as mobile device 401, coupled to an eyewear device 100 over a network 495. The eyewear system 400 includes a memory for storing instructions and a processor for executing the instructions. Execution of the instructions of the eyewear system 400 by the processor 432 configures the eyewear device 100 to cooperate with the mobile device 401, and also with another eyewear device 100 over the network 495. The eyewear system 400 may utilize the memory 434 of the eyewear device 100 or the memory elements 540A, 540B, 540C of the mobile device 401 (FIG. 5).

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to drive the image display 580, and a display controller 584 to control the image display 580. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU) 530. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6:
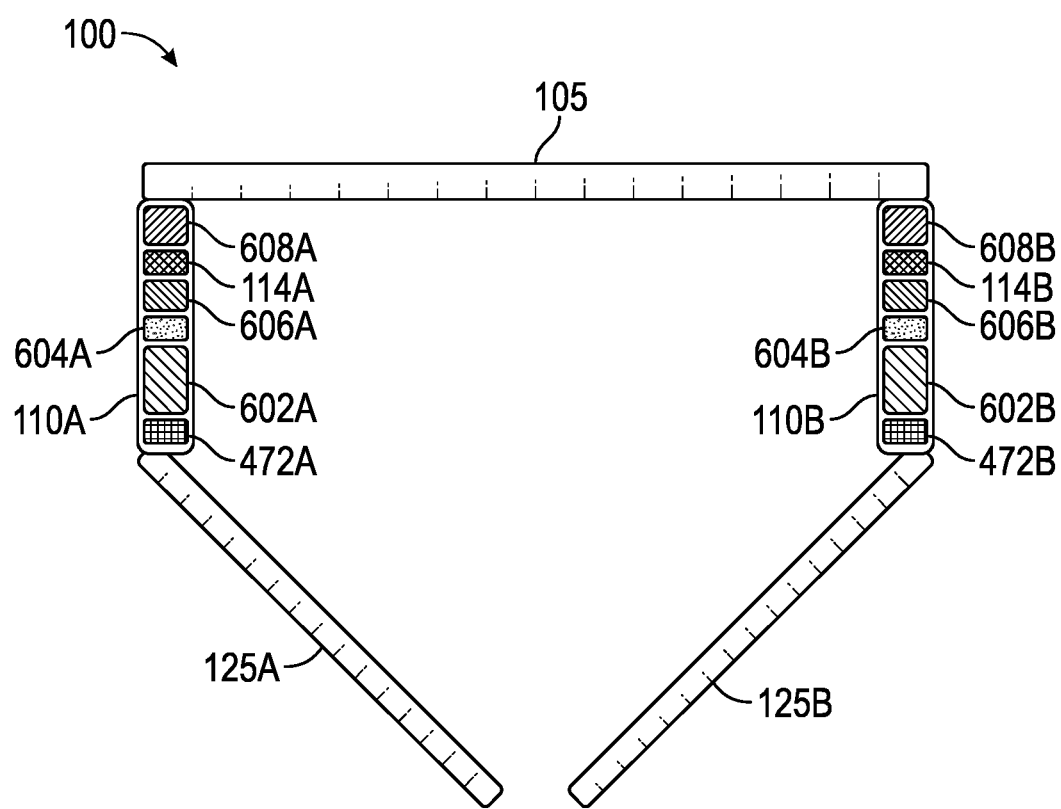
FIG. 6 is a partial block diagram of an eyewear device with a first system on a chip adjacent one temple and a second system on a chip adjacent the other temple.

FIG. 6 is a partial block diagram of an eyewear device 100 incorporating a first SoC 602A and a second SoC 602B in accordance with one example. The first SoC 602A is positioned within a left temple portion 110A along with a memory 604A (e.g., flash memory), a battery 606A, an IMU 472A, a camera 114A, and display components 608A. The second SoC 602B is positioned within a right temple portion 110B along with a memory 604B (e.g., flash memory), a battery 606B, an IMU 472B, a camera 114B, and display components 608B. The first SoC 602A is coupled to the second SoC for communications there between.

Although illustrated in the left temple portion 110A, one or more of the first SoC 602A, memory 604A, battery 606A, and display components 608A may be positioned in the frame 105 adjacent the left temple portion 110A (i.e., on the left lateral side 170A) or in the temple 125A. Additionally, although illustrated in the right temple portion 110B, one or more of the second SoC 602B, memory 604B, battery 606B, and display components 608B may be positioned in the frame 105 adjacent the right temple portion 110B (i.e., on the right lateral side 170B) or the temple 125B. Furthermore, although two memories 604A, B, batteries 606A, B, and display components 608A, B are illustrated, fewer or more memories, batteries, and display components may be incorporated. For example, a single battery 606 may power both SoCs 602A, B and SoCs 602A, B may access three or more memories 604 for performing various operations.

In one example, both SoCs 602 incorporate the same or substantially similar components and component layouts. Thus, their total processing resources are equivalent. In accordance with this example, the first SoC 602A is at least substantially identical to the second SoC (i.e., they are identical or have on overlap is components or processing resources of 95% or greater). Through the use of dual SoCs 602 (one positioned on one side of the eyewear device 100 and the other on the other side of the eyewear device) cooling is effectively distributed throughout the eyewear device 100 with one side of the eyewear device providing passive cooling for one SoC 602 and the other side of the eyewear device providing passive cooling for the other SoC 602.

In one example, the eyewear device 100 has a thermal passive cooling capacity per temple of approximately 3 Watts. The display 608 on each side (e.g., a projection LED display) utilizes approximately 1-2 Watts. Each SoC 602 is designed to operate at less than approximately 1.5 Watts (e.g., 800-1000 mW; unlike the approximately 5 Watts typically used for an SoC in a mobile phone), which enables suitable cooling of the electronics on each side of the eyewear device 105 utilizing passive cooling through the frame 105, temple portions 110A, temples 125A, or a combination thereof. By incorporating two SoCs 602 (positioned on opposite sides of the eyewear device 100 to take advantage of the unique passive cooling capacity presented by the eyewear device 100), computational power meeting or exceeding that available in a conventional mobile device (which utilizes an SoC operating at 5 Watts of power dissipated) is achievable.

Incorporating the same or similar components and component layouts in each SoC, enables flexibility in distributing processing workload between the two SoCs 602. In one example, processing workload is distributed based on adjacent components. In accordance with this example, each SoC may drive a respective camera and a display, which may be desirable from an electrical standpoint. In another example, processing workload is distributed based on functionality. In accordance with this example, one SoC 602 may act as a sensor hub (e.g., do all computer vision, CV, and machine learning, ML, processing plus video encoding) and the other SoC 602 may run application logic, audio and video rendering functions, and communications (e.g., Wi-Fi, Bluetooth®, 4G/5G, etc.). Distributing processing workload based on functionality may be desirable from a privacy perspective. For example, processing sensor information with one SoC and Wi-Fi with the other enables an implementation where private data such as camera images may be prevented from leaving the eyewear device unnoticed by not allowing such sensor information to be sent from the SoC doing sensor processing to the SoC managing communications. In another example, as descripted in further detail below, processing workload can be shifted based on processing workload (e.g., determined by SoC temperature or instructions per second).

Figure 7:
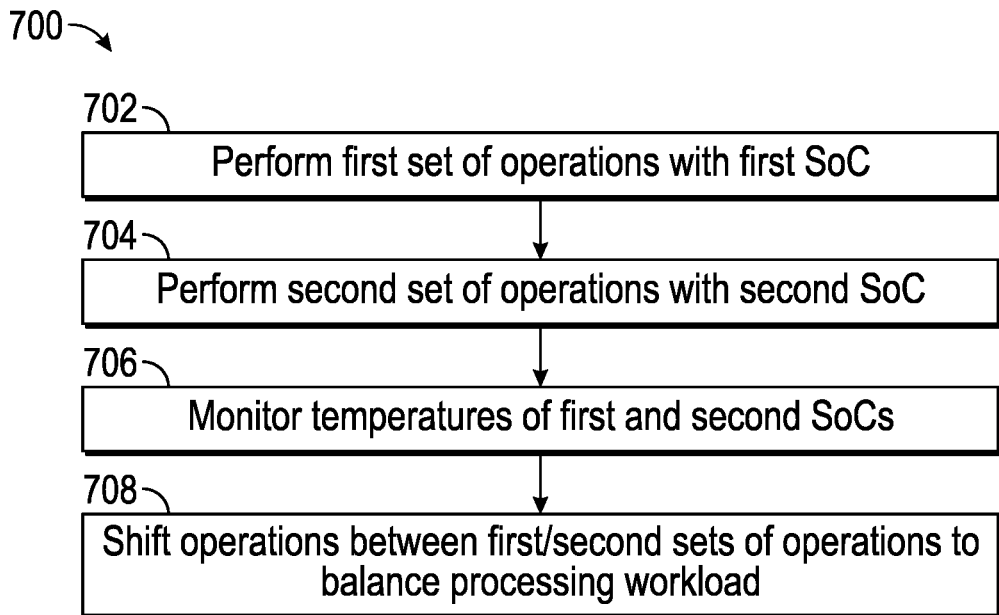
FIG. 7 is a flowchart of example steps for performing operations on eyewear with a first system on a chip and a second system on a chip.
Figure 8:
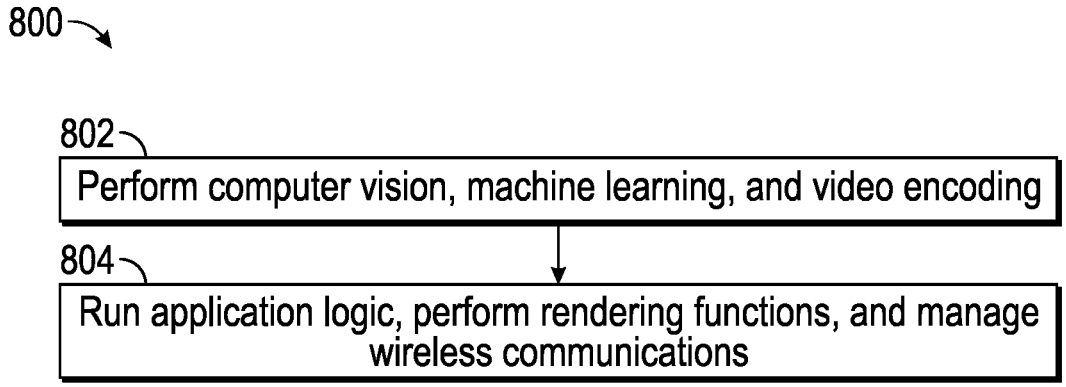
FIG. 8 is a flowchart of example steps for a method of balancing processing workloads on an eyewear device between a first system on a chip and a second system on a chip.
Figure 9:
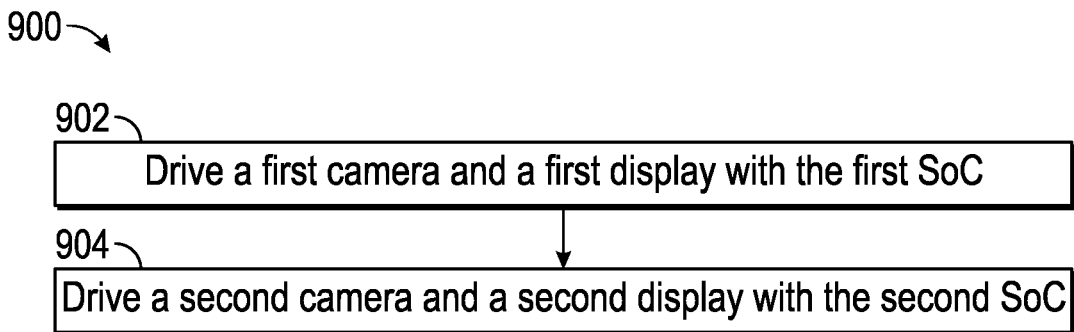
FIG. 9 is a flowchart of example steps for another method of balancing processing workloads on an eyewear device between a first system on a chip and a second system on a chip.

FIGS. 7-9 are flowcharts 700/800/900 for implementing dual SoCs in an eyewear device. Although the steps are described with reference to eyewear device 100, other suitable eyewear devices in which one or more steps of the flowcharts 700/800/900 can be practices will be understood by one of skill in the art from the description herein. Additionally, it is contemplated that one or more of the steps shown in FIGS. 7-9, and described herein may be omitted, performed simultaneously or in series, performed in an order other than illustrated and described, or performed in conjunction with additional steps.

FIG. 7 is a flowchart 700 of example steps for performing operations on eyewear with a first system on a chip and a second system on a chip. At block 702, a first SoC (e.g., SoC 602A) performs a first set of operations. At block 704, a second SoC (e.g., SoC 602B) perform a second set of operations. The first and second sets of operations may be distributed there between for performance on the respective SoC based on adjacent components, functionality, current workload processing (e.g., as determined based on temperature as described in the example steps of flow chart 700 or instructions per second), or a combination thereof At block 706, the eyewear device 100 monitors temperatures of first and second SoCs. In one example, each SoC includes an integrated thermistor for measuring temperature. In accordance with this example one SoC may be designated as a primary SoC and the other SoC may be designated as a replica SoC. The primary SoC may monitor its own temperature via a respective integrated thermistor and may monitor the temperature of the replica SoC by periodically requesting temperature readings from the replica SoC (which monitor its own temperature via a respective integrated thermistor).

At block 708, the eyewear device 100 shifts processing workloads between the first and second sets of operations performed on respective SoC to balance temperature (which effective distributes processing workload). In examples including a primary SoC and a replica SoC, the primary SoC manages the assignments of workloads to itself and to the replica SoC to maintain a relatively even distribution between the SoCs. In one example, when one of the SoC has a temperature that is above 10% of the temperature of the other SoC, the primary SoC reallocates processing workload from the SoC with the higher temperature to the SoC with the lower temperature until the temperature different is less than 5%. Processing instructions performed by each of the SoC may be assigned assignability values from 1 to 10 with 1 never being assignable and 10 always being assignable. When shifting processing workloads, the primary SoC initially shifts instructions with assignability values of 10, then 9, 8, etc. The steps for blocks 706 and 708 are continuously repeated to maintain even thermal distribution.

FIG. 8 is a flowchart 800 of example steps of a method for balancing processing workloads on an eyewear device between a first SoC and a second SoC. At block 802, a first SoC performs computer vision, machine learning, and video encoding. At block 804, a second SoC runs application logic, perform rendering functions, and manage wireless communications.

FIG. 9 is a flowchart 900 of example steps of another method of balancing processing workloads on an eyewear device between a first SoC and a second SoC. At block 902, the first SoC drives a first camera and a first display. At block 904, a second SoC drives a second camera and a second display.

Figure 10A:
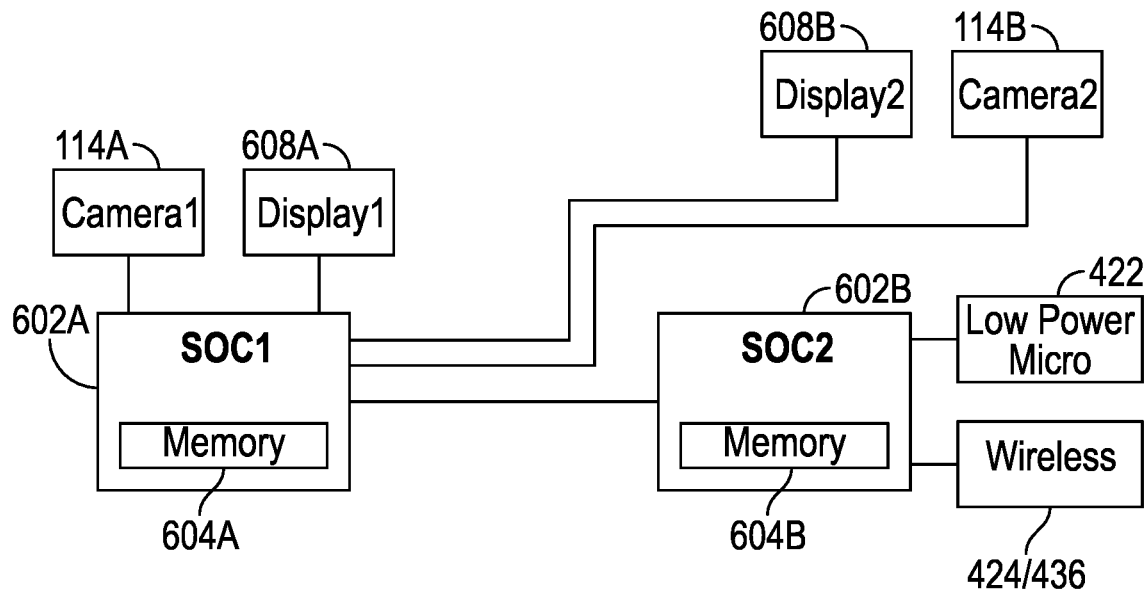
FIGS. 10A, 10B, and 10C depict three respective strategies for dividing processing workload between a first system on a chip and a second system on a chip.

FIG. 10A depicts a client-server strategy for dividing processing workload between a first SoC 602A and a second SoC 602B of an eyewear device 100. This strategy balances power from a first side of the eyewear device 100 (e.g., left) to a second side of the eyewear device 100 (e.g., right), reduces interconnect complexity (e.g., with wireless subsystem managed by the second SoC 602B, and can be dynamically allocated between the left and right based on thermal load, processing requirements, or a combination thereof.

The first SoC 602A is connected to the second SoC 602B, e.g., by an interprocessor communication bus such as PCI Express, SDIO, USB, etc. A first memory 604A is incorporated into the first SoC 602A and a second memory 604B is incorporate into the second SoC 602B. In the illustrated example, a first camera 114A, a second camera 114B, a first display 608A, and a second display 608B of the eyewear device are coupled direction to the first SoC 602A. The second SoC 602B is coupled to a low power microprocessor 422 and to wireless circuitry 424/436.

Each SoC operates at approximately 1.5 Watt or less (e.g., 800-850 mW). In one example, the first SoC 602A is responsible for running an operating system on a CPU (100 mW), capturing images with an ISP/DSP (200 mW), rendering still and video images on a GPU (200 mW), and running various algorithms on the CPU, dedicated hardware accelerated logic blocks (e.g., a disparity mapper), and the DSP (350 mW) for a total of 850 mW of power allocated to the first side of the eyewear device. The second SoC 602B is responsible for running an operating system on a CPU (100 mW), wireless connectivity using the CPU (100 mW), running various algorithms on the CPU and a DSP (300 mW), and running various algorithms on the CPU, a GPU, and the DSP (300 mW) for a total of 800 mW of power allocated to the second side of the eyewear device. This implementation is well below the target of approximately 2-3 W of passive thermal distribution per side of the eyewear device 100.

Figure 10B:
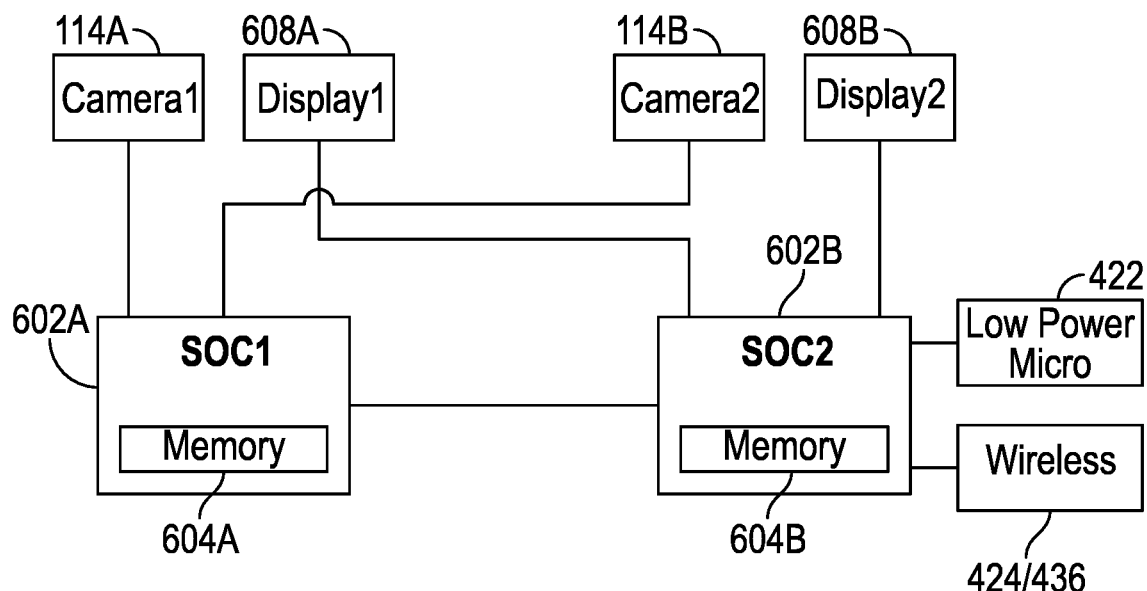

FIG. 10B depicts a split image capture and rendering strategy for dividing processing workload between a first SoC 602A and a second SoC 602B of an eyewear device 100. The first SoC 602A is coupled directly to the first and second cameras 114A, B and the second SoC 602B is coupled directly to the first and second displays 608A, B, the low power microprocessor 422 and the wireless circuitry 424/436. The first SoC 602A may be connected to the second SoC 602B by an interprocessor communication bus such as PCI Express, SDIO, USB, etc. and power can be allocated dynamically between the left and right based on thermal load, processing requirements, or a combination thereof. This strategy includes a layer of security by coupling the cameras 114A, B directly to a first SoC 602A and not directly to the second SoC 602B or the wireless circuitry 424/436.

Each SoC operates at approximately 1.5 Watts or less (e.g., 950-1000 mW). In one example, the first SoC 602A is responsible for running an operating system on a CPU (100 mW), capturing images with an ISP/DSP (200 mW), various algorithms on the CPU, dedicated hardware accelerated logic blocks (e.g., a disparity mapper), and the DSP (350 mW), and running various algorithms on the CPU, a GPU, and the DSP (300 mW) for a total of 950 mW of power allocated to the first side of the eyewear device. The second SoC 602B is responsible for running an operating system on a CPU (100 mW), wireless connectivity using the CPU (100 mW), rending images on the GPU (200 mW), running various algorithms on the CPU and a DSP (300 mW), and running various algorithms on the CPU, the GPU, and the DSP (300 mW) for a total of 1000 mW of power allocated to the second side of the eyewear device. This implementation is well below the target of approximately 2-3 W of passive thermal distribution per side of the eyewear device 100.

Figure 10C:
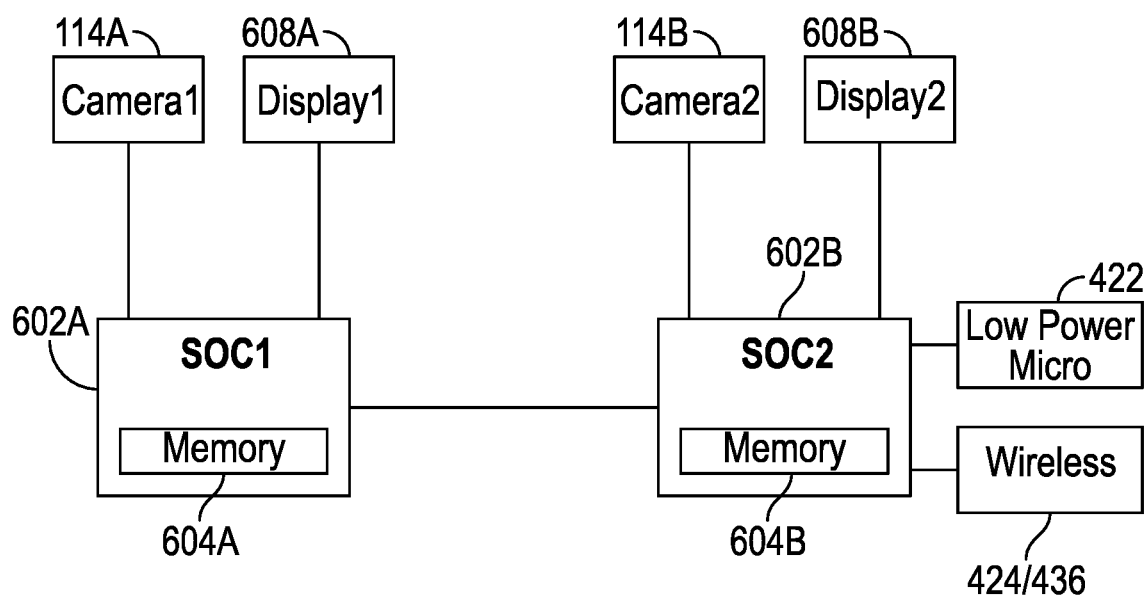

FIG. 10C depicts a left-right component strategy for dividing processing workload between a first SoC 602A and a second SoC 602B of an eyewear device 100. The first SoC 602A is coupled directly to the first camera 114A and the first display 608A and the second SoC 602B is coupled directly to the second camera 114B and the second display 608B, the low power microprocessor 422 and the wireless circuitry 424/436. The first SoC 602A may be connected to the second SoC 602B by an interprocessor communication bus such as PCI Express, SDIO, USB, etc. and power can be allocated dynamically between the left and right based on thermal load, processing requirements, or a combination thereof.

Each SoC operates at approximately 1.5 Watts or (e.g., 950-1000 mW). In one example, the first SoC 602A is responsible for running an operating system on a CPU (100 mW), capturing images with an ISP/DSP (100 mW), rending images on the GPU (100 mW), various algorithms on the CPU, dedicated hardware accelerated logic blocks (e.g., a disparity mapper), and the DSP (350 mW), and running various algorithms on the CPU, the GPU, and the DSP (300 mW) for a total of 950 mW of power allocated to the first side of the eyewear device. The second SoC 602B is responsible for running an operating system on a CPU (100 mW), wireless connectivity using the CPU (100 mW), capturing images with an ISP/DSP (100 mW), rending images on the GPU (100 mW), running various algorithms on the CPU and a DSP (300 mW), and running various algorithms on the CPU, the GPU, and the DSP (300 mW) for a total of 1000 mW of power allocated to the second side of the eyewear device. This implementation is well below the target of approximately 2-3 W of passive thermal distribution per side of the eyewear device 100.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
   a frame having a first side and a second side;
   a first temple extending from the first side of the frame;
   a second temple extending from the second side of the frame;
   a plurality of electronic components;
   a first system on a chip (SoC) adjacent the first side of the frame, the first SoC coupled to a first set of the plurality of electronic components; and
   a second system on a chip adjacent the second side, the second SoC coupled to the first SoC and to a second set of the plurality of electronic components;
   wherein the eyewear further comprises first display components adjacent the first side, second display components adjacent the second side, a passive thermal cooling capacity of approximately 2 to 3 Watts adjacent each of the first and second sides and wherein each of the first and second SoCs operates at approximately 1.5 Watts or less and each of the first and second display components operate at approximately 1 to 2 Watts.

2. The eyewear of claim 1, wherein the first SoC has first total processing resources and the second SoC has second total processing resources equivalent to the first total processing resources.

3. The eyewear of claim 2, wherein the first SoC is at least substantially identical to the second SoC.

4. The eyewear of claim 1, further comprising load balancing instructions for execution on the first and second SoC, the load balancing instructions, when executed by the first and second SoCs, shift processing workload between the first and second SoCs.

5. The eyewear of claim 4, further comprising:
   a first temperature sensor adjacent the first SoC, the first temperature sensor generating a first temperature value; and
   a second temperature sensor adjacent the second SoC, the second temperature sensor generating a second temperature value;
   wherein the load balancing instructions configure the first and second SoCs to shift the processing workload responsive the first and second temperature values.

6. The eyewear of claim 1, further comprising:
   a first battery and a first flash memory coupled to the first SoC; and
   a second battery and a second flash memory coupled to the second SoC.

7. The eyewear of claim 6, further comprising:
   a first camera and a second camera coupled to the first SoC; and
   a first display and a second display coupled to the second SoC.

8. The eyewear of claim 6, further comprising:
   a first camera and a first display coupled to the first SoC; and
   a second camera and a second display coupled to the second SoC.

9. The eyewear of claim 1, wherein the first SoC performs computer vision, machine learning, and video encoding and the second SoC runs application logic, performs rendering functions, and manages communications.

10. A load balancing method for use in eyewear including a frame having a first side and a second side, a first temple extending from the first side of the frame, a second temple extending from the second side of the frame, and a plurality of electronic components, the method comprising:
    performing a first set of operations with a first SoC positioned adjacent the first side of the frame, the first SoC coupled to one or more of the plurality of electronic components; and
    performing a second set of operations with a second SoC positioned adjacent the second side of the frame, the second SoC coupled to one or more others of the plurality of electronic components;
    wherein the eyewear further comprises first display components adjacent the first side, second display components adjacent the second side, a passive thermal cooling capacity of approximately 2 to 3 Watts adjacent each of the first and second sides and wherein the first set of operations and the second set of operations are each performed using approximately 1.5 Watts or less.

11. The method of claim 10, wherein the first SoC is at least substantially identical to the second SoC.

12. The method of claim 10, further comprising:
shifting one or more operations between the first and second sets of operations to balance processing workload between the first and second SoCs.

13. The method of claim 12, further comprising:
monitoring a first temperature value adjacent the first SoC; and
monitoring a second temperature value adjacent the second SoC;
wherein the shifting of the one or more operations is responsive to the first and second temperature values.

14. The method of claim 10, wherein the first set of operations comprises performing computer vision, machine learning, and video encoding and the second set of operations comprises running application logic, performing rendering functions, and managing wireless communications.

15. The method of claim 10, where the performing the first set of operations comprises driving a first camera and a second camera with the first SoC and the performing the second set of operations comprises driving a first display and a second display with the second SoC.

16. A non-transitory computer readable medium including instructions for load balancing eyewear device including a frame having a first side and a second side, a first temple extending from the first side of the frame, a second temple extending from the second side of the frame, and a plurality of electronic components, the instructions when executed by the eyewear device configures the eyewear device to:
perform a first set of operations with a first SoC positioned adjacent the first side of the frame, the first SoC coupled to one or more of the plurality of electronic components; and
perform a second set of operations with a second SoC positioned adjacent the second side of the frame, the second SoC coupled to one or more others of the plurality of electronic components,
wherein the eyewear further comprises first display components adjacent the first side, second display components adjacent the second side, a passive thermal cooling capacity of approximately 2 to 3 Watts adjacent each of the first and second sides and wherein the first set of operations and the second set of operations are each performed using approximately 1.5 Watts or less.

17. The non-transitory computer readable medium of claim 16, wherein the instructions when executed by the eyewear device further configures the eyewear device to:
shift one or more operations between the first and second sets of operations to balance processing workload between the first and second SoCs.

18. The non-transitory computer readable medium of claim 17, wherein the instructions when executed by the eyewear device further configures the eyewear device to:
monitor a first temperature value adjacent the first SoC; and
monitor a second temperature value adjacent the second SoC;
wherein the shift of the one or more operations is responsive to the first and second temperature values.

19. The non-transitory computer readable medium of claim 16, wherein the first set of operations comprises performing computer vision, machine learning, and video encoding and the second set of operations comprises running application logic, performing rendering functions, and managing wireless communications.

20. The non-transitory computer readable medium of claim 16, where the performing the first set of operations comprises driving a first camera and a second camera with the first SoC and the performing the second set of operations comprises driving a first display and a second display with the second SoC.

* * * * *